US008999868B2

(12) United States Patent
Rosé et al.

(10) Patent No.: US 8,999,868 B2
(45) Date of Patent: Apr. 7, 2015

(54) NON-WOVEN PRODUCT THAT CONTAINS ORGANIC AND/OR MINERAL PARTICLES AND ITS PROCESS FOR PRODUCTION

(75) Inventors: Frédéric Rosé, Riquewihr (FR); Georges Riboulet, Colmar (FR); Massimo Migliavacca, Milan (IT); Jean-Marc Losser, Mussig (FR); Robert Groten, Sunhoffen (FR)

(73) Assignee: Freudenberg Politex SA (Societe Anonyme), Colmar (FR)

( * ) Notice: Subject to any disclaimer, the term of this patent is extended or adjusted under 35 U.S.C. 154(b) by 184 days.

(21) Appl. No.: 13/050,038

(22) Filed: Mar. 17, 2011

(65) Prior Publication Data

US 2011/0230112 A1    Sep. 22, 2011

(30) Foreign Application Priority Data

Mar. 17, 2010    (FR) ..................................... 10 51890

(51) Int. Cl.
*B32B 5/26* (2006.01)
*B32B 5/06* (2006.01)
(Continued)

(52) U.S. Cl.
CPC  *D04H 1/587* (2013.01); *B32B 5/06* (2013.01); *B32B 5/10* (2013.01); *B32B 5/26* (2013.01); (Continued)

(58) Field of Classification Search
USPC ........... 442/65, 74–17, 74–77, 393, 381, 383, 442/388, 389, 392, 402, 403–407, 417; 428/143, 372, 402, 403–407
See application file for complete search history.

(56) References Cited

U.S. PATENT DOCUMENTS

| 2,782,130 A | 5/1952 | Ness et al. |
| 3,936,555 A | 2/1976 | Smith, II |

(Continued)

FOREIGN PATENT DOCUMENTS

| EP | 1 664 418 B1 | 5/2008 |
| FR | 2 640 288 A1 | 6/1990 |

(Continued)

OTHER PUBLICATIONS

Polymer Data Handbook, Dec. 2009, Oxford University Press, 558-559, 870-872.*

(Continued)

*Primary Examiner* — Arti Singh-Pandey
*Assistant Examiner* — Frank Vineis
(74) *Attorney, Agent, or Firm* — Young & Thompson

(57) ABSTRACT

A non-woven product containing organic and/or mineral particles has a volume density less than 1 and has at least two layers of synthetic fibers or filaments superposed in the Z direction perpendicular to the XY plane of the product, having undergone at least one needling operation, where the non-woven product integrates particulate feedstocks of mineral and/or organic particles distributed in a monomodal or multimodal manner in the product and at least partially coated or encapsulated by binding material that can point-connect the filaments or fibers to one another. At least one population or fraction of organic and/or mineral particles, has a size such that:

$$3 \times (\sqrt{SMf})^3 \le v, \text{ preferably } 5 \times (\sqrt{SMf})^3 \le v,$$

where SMf corresponds to the mean cross-section of the fibers or filaments that form the layers, and v represents the mean individual volume of the organic or mineral particles.

20 Claims, 7 Drawing Sheets

(51) Int. Cl.

| | | |
|---|---|---|
| *B32B 7/08* | (2006.01) | |
| *D04H 1/587* | (2012.01) | |
| *B32B 5/10* | (2006.01) | |
| *D04H 1/413* | (2012.01) | |
| *D04H 1/48* | (2012.01) | |
| *D04H 1/49* | (2012.01) | |
| *D04H 1/492* | (2012.01) | |
| *D04H 1/498* | (2012.01) | |
| *D04H 3/105* | (2012.01) | |
| *D04H 3/11* | (2012.01) | |
| *D04H 3/12* | (2006.01) | |
| *D04H 13/00* | (2006.01) | |

(52) U.S. Cl.
CPC ....... *B32B 2250/20* (2013.01); *B32B 2260/023* (2013.01); *B32B 2260/046* (2013.01); *B32B 2262/02* (2013.01); *B32B 2262/101* (2013.01); *B32B 2264/00* (2013.01); *B32B 2264/02* (2013.01); *B32B 2264/10* (2013.01); *B32B 2307/50* (2013.01); *D04H 1/413* (2013.01); *D04H 1/48* (2013.01); *D04H 1/49* (2013.01); *D04H 1/492* (2013.01); *D04H 1/498* (2013.01); *D04H 3/105* (2013.01); *D04H 3/11* (2013.01); *D04H 3/12* (2013.01); *D04H 13/00* (2013.01)

(56) References Cited

U.S. PATENT DOCUMENTS

| | | |
|---|---|---|
| 4,076,917 A | 2/1978 | Swift et al. |
| 4,622,260 A | 11/1986 | Tesch |
| 5,118,550 A | 6/1992 | Baravian et al. |
| 6,071,994 A | 6/2000 | Hummerich et al. |
| 6,221,973 B1 | 4/2001 | Arkens et al. |
| 6,299,936 B1 | 10/2001 | Reck et al. |
| 7,851,542 B2 | 12/2010 | Michl et al. |
| 2005/0148264 A1* | 7/2005 | Varona et al. ............... 442/382 |
| 2005/0159063 A1* | 7/2005 | Patel et al. ................. 442/327 |
| 2008/0003906 A1* | 1/2008 | Hill et al. .................. 442/221 |
| 2009/0048371 A1 | 2/2009 | Weber |
| 2010/0206804 A1 | 8/2010 | Weber et al. |

FOREIGN PATENT DOCUMENTS

| | | |
|---|---|---|
| RU | 2123927 C1 | 12/1998 |
| RU | 2301855 C2 | 6/2007 |
| WO | 97/31036 A1 | 8/1997 |
| WO | 2009033627 A1 | 3/2009 |

OTHER PUBLICATIONS

ScienceLab.com, Cellulose MSDS, Jun. 9, 2012.*

* cited by examiner

Mean Failure Load/
Pressure = 200.0 Bar

Elongation at Break =
170.0 Bar

NON-WOVEN PRODUCT THAT CONTAINS ORGANIC AND/OR MINERAL PARTICLES AND ITS PROCESS FOR PRODUCTION

FIELD OF THE INVENTION

This invention relates to the field of substrates based on non-woven fabrics made of synthetic textiles.

It relates to a flexible and dimensionally stable non-woven product in the form of a frame or substrate that is made of thermoplastic polymers and that consists of chemically-linked filaments or fibers, as well as its process for production.

More particularly, the purpose of this invention is the enhancement of physical and mechanical properties of non-woven textiles that are made of chemically-linked continuous fibers or filaments by the use of mineral and/or organic feedstocks, for example integrated in the binder during the phase of impregnation, coating or dispersion and thus partially or totally encapsulated by the resin after cross-linking.

BACKGROUND OF THE INVENTION

The mineral and/or organic particulate feedstock can consist of a mixture of different populations in grain size and/or in nature, making it possible to increase both the number of connections between the layers of the fibrous network constituting the non-woven product and optionally the size of the connecting points between filaments or fibers.

In the above-mentioned field, the current trend is toward the production of new non-woven products either by reduction of components, or by the use of products that are less elegant, but are durable or renewable or recyclable, or else have lower-energy contents, for economic or environmental reasons.

At the same time, the drive to lower production costs is pushing manufacturers to produce faster and faster, while at the same time meeting increasingly high requirements.

The mechanical and hot stability properties of the non-woven products that are used as frames become absolutely decisive factors, as much for their suitability for transformation during the formation of bitumens or hot treatments under analogous constraints, because of a thermal memory effect, as well as relative to the requirements of quality and durability in the final application.

Currently, these frames frequently consist of a non-woven fabric of 80 $g/m^2$ to 350 $g/m^2$ that can be linked and stabilized chemically in the case of a homopolymer substrate or thermally in the case where surfaces are used that consist of two polymers by the melting of one of them.

In some cases, these non-woven surfaces or products can be reinforced by wires, grids, fabrics or glass or synthetic polymer woven materials with very high moduli, before optionally being used as frames that are designed to be impregnated and coated using bitumens that are modified by polymers or other substrates or to undergo transformations under thermal constraints.

In a general way, these surfaces, after being layered following wet, dry or molten production processes that are known to one skilled in the art, undergo intermixing by mechanical needling or by hydraulic binding before their thermal and/or chemical consolidation so as to ensure at least partial cohesion of the fibrous network and thus to impart to it the bulk of its rupture strength.

The chemical or thermal binding that subsequently occurs has as its objective to make the non-woven surface or product dimensionally stable relative to the thermomechanical constraints to which the surface or the product can be subjected.

A possible additional reinforcement of these textiles, by wires, grids or glass or polymer woven materials with very high moduli, incorporated before the mechanical or hydraulic or chemical binding or during the layering, has as its objective to reduce even further its deformability under hot stress (at the post-treatment or transformation temperature) of these thus stabilized fibrous structures.

Actually, these non-woven surfaces or products in layers require high dimensional stability both in place and in aging. Moreover, during their production or transformation, they simultaneously undergo mechanical and thermal constraints with intensities that are quite higher than those undergone during use or final implementation.

Numerous types of non-woven products, meeting in a more or less satisfactory manner the above-mentioned requirements as well as their production processes, have already been proposed and are known in the field.

Thus, the French Patent FR 88 16711 describes a process for the production of a substrate based on non-woven material for a flat article of good dimensional stability that can be linked chemically or thermally, having a weight of between 20 and 500 $g/m^2$, and reinforced longitudinally by continuous threads with high moduli, preferably greater than 50 GPa. In the resulting non-woven product, the breaking of glass threads occurs, under a temperature of 180° C., and under a constraint of at least 80 N per meter of width, and the modulus under cold conditions is the same with or without a reinforcing thread. The dimensional stability under hot conditions and the deformability are thus essentially enhanced relative to standard non-woven products.

The composition as well as the cross-linking mechanism at approximately 200° C. of aqueous chemical binders for non-woven products used in the industry of sealing frames are known by the document U.S. Pat. No. 6,221,973. These binders consist of mixtures of a polyacid that contains at least two carboxylic groups, one polyalcohol that contains at least two hydroxylic groups, and an accelerator.

So as to meet new international standards, the resulting resin that forms a binder disclosed by this US document is substantially free of formaldehyde. This resin is impregnated on a non-woven substrate made of glass fibers that is designed for the production of bitumen-containing coatings. With the glass fibers themselves being insensitive to the temperature range encountered during asphalt application, the essential function of the binder is then to ensure the cohesion of fibers by the solidity and adhesion of the chemical bond points, so as to prevent a mechanical shrinkage of the surface by developing an acceptable resistance, whereby the surface is not consolidated in advance.

Unlike frames made of polyester and more generally the non-woven products made of thermoplastic polymers, the glass fibers or threads that compose the structure that is described in this US document do not undergo structural modifications that are linked to the high stresses and temperatures that are exerted, which can then produce residual shrinkage behavior during the thermal cycles that occur during use.

Numerous other examples of binders that make it possible to consolidate non-woven surfaces are known in the prior art, for example by the documents U.S. Pat. No. 4,076,917, EP 0 583 086, and WO 97/31036.

Certain recent applications or product/market requirements simultaneously demand a very good dimensional stability combined with an increase of the thickness of the non-woven products.

With technical and economic constraints not always allowing an increase of the surface weight, it is then necessary to act on a reduction of the density of the product, generally located in a range of 0.15 to 0.3, or approximately 70 to 80% of vacuum based on the material to be linked.

It is readily understood that this increase of thickness with constant grammage negatively influences the number as well as the size of the connecting points by the increase of the distances between filaments or fibers of layers that are superposed along the Z-axis, and consequently negatively influences the stability and/or the modulus of the non-woven product concerned.

The documents U.S. Pat. No. 6,299,936 and EP 1 664 418 cite the use of cross-linkable resins in aqueous dilution of 40% to 95%, optionally supplemented with mineral feedstocks such as boron, glass silicates or fibers, for the purpose of the production of very rigid and thick products (>1 cm) that consist of inorganic fibers and that are used in insulation.

These documents also mention applications in relation to the possible consolidation of frames of seals or sublayers of cloth or paper. However, said substrates consist only of glass fibers or filaments and are therefore insensitive to temperature in the fields in question. In addition, said non-woven products are not linked in advance by an intermixing of the hydraulic or mechanical needling type, considerably weakening the network.

Furthermore, the document US 2009/0048371 describes the production of a bitumen-containing sealing membrane on the two surfaces, based on a non-woven fabric made of synthetic or artificial fibers, which is consolidated by a mixture of at least one chemical binder and aluminum hydroxide.

The drying and the cross-linking of the binder are preferably implemented at a temperature of 190° C. to 210° C. for approximately 0.5 minute to approximately 5 minutes and preferably 1.3 to 3.0 minutes. The weight ratio of the dry binder is preferably between 15 and 20% (0.5% to 30%) of the weight of the non-woven product to be linked. Aluminum hydroxide is incorporated with a ratio of 10% to 100% of the ratio of dry chemical binder. The sizes of the aluminum hydroxide particles range from 0.5 µm to 50 µm, and preferably between 0.9 µm and 5 µm. The non-woven layer is then coated or impregnated with bitumen to form the membrane.

This US document claims an enhancement of the failure load and the thermal stability of the surface that is thus produced.

Nevertheless, in the comparative examples cited, a very significant reduction of the failure load and an increase in deformability are noted in particular during the use of 10 parts of calcium carbonate or kaolin.

The document BE 858 986 describes the use of a binder that comprises a mixture of polymer, a binder that is formed by emulsion, and an inert feedstock that is designed to increase the mechanical strength of the fabric. The surface to be linked consists of a mixture of synthetic, natural and/or artificial fibers in light grammages, with cohesion and the final properties of the fabric being ensured only using this binder that sets the fibers for preventing disintegration or enhancing resistance to it.

The mean surface weight of these surfaces is on the order of 25 to 35 g/m² and the production of heavier surfaces is ensured by superposition and subsequent consolidation of individual surfaces.

The most favorable level of strength reached in terms of traction, even enhanced by the mineral feedstocks that are used, is very low and is on the order of 50 N to 80 N/5 cm calculated for 100 g/m². These values are to be compared to those of a non-woven product that forms a sealing frame, which are on the order of 5 to 10 times greater, to reach 250 to 350 N/5 cm for the same final weight.

The field of application of the products that are described in this BE document is primarily within the framework of textiles that are almost disposable or are intended for thermal insulation. These non-woven products are unsuitable for use within the framework of sealing frames or thermally stable substrates because of the weakness of the cohesion as well as the level of the mechanical properties obtained. It is also noted that certain feedstocks, such as calcium silicate, generate a loss of strength of the non-woven product.

SUMMARY OF THE INVENTION

The purpose of this invention, relative to a flexible non-woven product, with a density of less than 1, based on synthetic material(s) and integrating at least one binder, is to enhance the physical and mechanical properties of this product by increasing in particular the size and the number of connecting points between the fibers or filaments that belong to the different layers of the product and preferably also between the fibers or filaments of the same layer.

The invention should advantageously also make it possible to modulate, to modify, or to enhance the physical and/or mechanical properties and particularly the elastic behavior, and deformability under cold and hot conditions for the production of non-woven substrates, in particular consolidated by a cross-linkable chemical binder.

For this purpose, the invention has as its object a flexible non-woven product that has a volume density that is less than 1 and that is formed by at least two layers of synthetic fibers or filaments superposed in the Z direction that is perpendicular to the XY plane of said product, having undergone at least one mechanical or hydraulic needling operation, whereby said non-woven product also integrates particulate feedstocks in the form of mineral and/or organic particles distributed in a monomodal or multimodal manner in this product and at least partially coated or encapsulated by a binding material that can at least point-connect the filaments or fibers to one another, a non-woven product that is characterized in that at least one population or fraction of organic and/or mineral particles, called "large particles," has a size such that:

$$3 \times (\sqrt{SMf})^3 \leq v, \text{ preferably } 5 \times (\sqrt{SMf})^3 \leq v,$$

where SMf corresponds to the mean cross-section of the fibers or filaments that form the layers of the non-woven product, and v represents the mean individual volume of the organic or mineral particles.

Advantageously, the large particles constitute the majority fraction, in terms of weight and/or volume, of the particulate feedstocks that are present in the non-woven product and produce bridgings or connections between the nodes, meshes, fibers and filaments of the same layer and between the superposed layers that form the non-woven product.

According to a preferred variant embodiment of the invention, the non-woven product has at least one of the following characteristics:

The large particles have at least one dimension d such that $d \geq 3 \times DMf$, preferably $d \geq 5 \times DMf$, where DMf corresponds to the mean diameter of the fibers or filaments that form the layers of the non-woven product, The large particles have a mean size that corresponds to at least 20% of the mean size of the visible pores of layers of the non-woven product that can be seen in the Z direction, perpendicular to the XY plane of the non-woven product.

Within the framework of non-woven products whose filament fibers have a nominal value within the usual range, the large particles advantageously have a mean grain size that is greater than approximately 50 μm, preferably greater than approximately 60 μm.

Although a significant size of the large particles is beneficial for establishing connections and bridgings between fibers and filaments of separated layers, it is nevertheless necessary that these large particles can be introduced into the fibrous network of the non-woven product and that in addition, they do not generate a local excess thickness (by deformation of the layers or by projecting). It is therefore necessary that their size also be adapted so that they can nest in the thickness of the non-woven product.

The inventors noted that these objects were reached when the individual volume v of the large particles also verifies the following inequality: $v \leq 50 \times (\sqrt{SMf})^3$, preferably $v \leq 30 \times (\sqrt{SMf})^3$.

Preferably, at least one of the two following arrangements is also verified:
  The large particles have a mean size that is less than approximately 120%, preferably approximately 100%, of the mean size of the visible pores of the layers of the non-woven product seen in the Z direction that is perpendicular to the XY plane of said product,
  The large particles have a mean grain size that is less than approximately 400 μm, advantageously approximately 300 μm, and preferably approximately 200 μm.

So as to enhance the quality and to increase the number of connections between fibers or filaments of the same layer, the mineral and/or organic particulate feedstocks also comprise a population or fraction of particles whose grain size is less than 30 μm, preferably 20 μm.

Consistent with an advantageous embodiment of the invention, the mineral and/or organic feedstocks are present with a ratio by weight of between 1% and 30%, preferably between 5 and 25% of the weight of fibers or filaments that form the layers of the non-woven product.

In this description, layer is defined as the superposition of a set of filaments or fibers that are oriented in an XY plane and are slightly intermixed in the same plane.

In the case of a molten process (continuous filament), the spinning speed (in general 30 to 120 m/s) is such that the curtain or bundle filaments during the layering are "flopped" on themselves, more or less by bundles, by being spread on the layering platform, thus forming micro-napping layers (micro-layers, sublayers) of several square millimeters or less, targeted by this invention.

In the case of a dry or wet process, the previously individualized fibers are deposited continuously in bundles on the layering platform, thus forming micro-layering layers as defined above.

The layering systems can optionally give rise to the superposition of several curtains or bundles, thus ending in the production of layers of these sublayers of filaments or fibers. This is the case of the multi-curtain processes (continuous filaments) or dry processes, in which the fabrics are superposed on one another.

Of course, the layers of layers can be produced by assembling different previously linked non-woven fabrics. The Z bridgings mentioned in this document pertain equally to layers or "sublayers" or "microlayers" at their interfaces.

For the purpose of preventing any influence of temperature in the ranges of temperatures to which the non-woven product is normally exposed during its phases of production, processing or application, the material(s) forming the mineral and/or organic particles has (have) a melting point that is greater than that of the material(s) forming the fibers or filaments of layers, if necessary at the melting point of activation, the cross-linking or drying of the binder.

As a variant, and based on the applications that are considered and the properties that are targeted for the non-woven product, it may be provided that the melting point of the organic particles is less than that of the fibers or filaments and, as appropriate, less than or greater than the temperature of heat-setting, drying, activation or cross-linking of the material that forms the binder.

According to additional advantageous characteristics of the invention, it may be provided that:
  The articles forming the feedstocks that have a grain size that is greater than 100 μm, advantageously greater than 60 μm, and preferably greater than 20 μm have an organic nature or origin,
  A portion of the particles forming the mineral and/or organic feedstocks consist of particles that can expand with the temperature.

Although the synthetic material forming the fibers or filaments can be any material whatsoever, provided that it is suitable for production of non-woven fabric and suitable for the application considered, the continuous fibers or filaments that form the layers of the non-woven product are based on a thermoplastic polymer material that is selected from the group that is formed by polypropylenes, polyesters, polyamides, polyethylenes, as well as copolymers of these different polymers and the possible mixtures of these different polymers and copolymers.

To increase the structural cohesion of the non-woven product and to enhance its performance levels within targeted ranges and characteristics, it can be provided that it integrates, optionally at or between two or more constituent layers, reinforcement structures in the form of filaments, grid(s) and/or textiles with characteristics of high stabilization, mineral and/or organic particles that are at least partially coated or encapsulated by the binder that establishes rigid connections or that produces bridgings between these reinforcement structures and the filaments or fibers of layers by means of said binder.

Consistent with preferred variant embodiments of the invention, it can also be provided that:
  The material that forms the mineral particles is selected from the group that is formed by carbonates, silicates and sulfates such as calcium carbonate, magnesium or aluminum hydroxide, barium sulfate, clay, kaolin, quartz, talc, and oxides and hydroxides such as titanium oxide, bauxite, and gibbsite,
  The material that forms the organic particles is selected from the group that is formed by fibrous or particulate celluloses, such as wood, lignin, graphites, micronized heat-setting recycled polymers, such as epoxy and BAKELITE (registered name) (thermosetting phenol formaldehyde resin), micronized thermoplastic polymers, such as PET (polyethylene terephthalate), PBT (polybutylene terephthalate), PP (polypropylene), PE (polyethylene), PA (polyamide), as well as their copolymers and/or,
  The material that forms the binder is selected from the group that is formed by the resins with or without formaldehyde, liquid resins, in emulsion or in dispersion based on acrylate, styrene acrylate, vinyl acetate, methacrylate, vinyl acrylate, acrylamides, methyl acrylamides, ethyl vinyl acetate, styrene butadiene, vinyl alcohol, butadiene acrylate, polyurethane, silicone, and cross-linking resins, based on phenol, melamine, urea, epoxy, alkyd, and polyester.

This invention also has as its object a process for the production of a flexible non-woven product that has a volume density that is less than 1 and that is formed by at least two layers of fibers or filaments that are superposed in the Z direction perpendicular to the XY plane of said product, having undergone at least one mechanical or hydraulic needling operation, whereby said non-woven product also integrates particulate feedstocks in the form of mineral and/or organic particles that are distributed in a monomodal or multimodal manner in this product and at least partially coated or encapsulated by a binding material that can at least point-connect the filaments or fibers to one another.

According to the invention, the process consists in particular in implementing—in advance, simultaneously with or following—the integration of the binding material in and/or between the layers of fibers or filaments, and a stage for incorporating mineral and/or organic particulate feedstocks comprising at least one population or fraction of organic and/or mineral particles, called "large particles," and has an individual volume such that $3\times(\sqrt{SMf})^3$ v, preferably $5\times(\sqrt{SMf})^3$ v, where SMf corresponds to the mean cross-section of the fibers or filaments forming the layers of the non-woven product, and v represents the mean individual volume of the organic or mineral particles.

In a preferred manner, the large particles that are incorporated in the non-woven product correspond to particles as described above, whereby the needling operation is implemented before or after the introduction of the particulate feedstocks in and between the layers of the non-woven product.

For the purpose of also multiplying or reinforcing the connecting points between fibers or filaments of the same layer, it is advantageously provided that the incorporated mineral and/or organic particulate feedstocks also comprise a population or fraction of particles of which the grain size is less than 30 µm, preferably 20 µm.

The process consists in incorporating mineral and/or organic feedstocks in the non-woven product with a weight ratio of between 1% and 30%, preferably between 5% and 25%, of the weight of fibers or filaments forming the layers of the non-woven product.

Consistent with a first variant embodiment of the process, all of the mineral and/or organic particles are incorporated simultaneously in the non-woven product, in advance or simultaneously with the chemical binder.

Consistent with a second variant embodiment of the process, the mineral particles and the organic particles are incorporated in a differentiated manner in the non-woven product, whereby the mineral particles are introduced following the organic particles.

The melting point of the material(s) forming the mineral and/or organic particles can be, as indicated above, less than, equal to, or greater than the melting point of the material(s) forming the fibers or filaments of the layers, if necessary at the melting point of activation, cross-linking, or drying of the binder.

Within the framework of the process according to the invention, it can also be provided that:

The particles that have a grain size of greater than 100 µm, advantageously greater than 60 µm, and preferably greater than 20 µm, have an organic nature or origin, A portion of the particles that form the mineral and/or organic feedstocks consists of particles that can expand with the temperature, and/or The continuous fibers or filaments that form the layers of the non-woven product are based on a thermoplastic polymer material that is selected from the group that is formed by polypropylenes, polyesters, polyamides, polyethylenes, as well as copolymers of these different polymers and the possible mixtures of these different polymers and copolymers.

So as to avoid sedimentation or agglomeration of the mineral and/or organic particles, the process can consist in using a thixotropic or dispersing agent, in the case of an introduction of particulate feedstocks and the binder by impregnation, when the density of the particles is greater by approximately 30%, preferably by approximately 20%, than that of the binder.

Finally, it can also be provided to integrate in the non-woven product—optionally at the or between two or more constituent layers—reinforcing structures in the form of filaments, grid(s) and/or textiles with high stabilization characteristics, whereby the mineral and/or organic particles that are at least partially coated or encapsulated by the binder establish rigid connections or produce bridgings between these reinforcing structures and the filaments or fibers of layers by means of said binder.

The invention will be better understood owing to the description below, which relates to preferred embodiments, provided by way of nonlimiting examples.

The process for the production of a non-woven product according to the invention partially implements operations that are known to one skilled in the art.

Thus, the layers of fibers or filaments of the non-woven product are obtained in a known manner either by a dry process or by a molten or wet process.

Regardless of the above-mentioned process that is implemented, the filament orientation has proven to be for the most part distributed in layers in XY planes. Very few strong bonds exist naturally along the Z-axis.

Intermixing processes, such as mechanical needling or hydraulic binding, make it possible to partially orient surface fibers or filaments initially in flat layers, in the direction of the thickness of the product. Calendaring that is smooth or intermittent as well as by passing hot air also make it possible to set this network thermo-mechanically by partial and specific melting of the polymer. Without this type of binding, the non-woven fabrics have virtually no mechanical hold.

In the case of an intermixing by needling, the number of perforations that is generally made is in a range of 20 to 150 perforations per $cm^2$ and commonly in a range of 25 to 70 perforations per $cm^2$. This rate of perforations therefore allows at most a filament bond or node at Z every 1 to 2 mm, provided that, however, the two separate needles do not perforate the same spot, which happens relatively frequently.

The cohesion by chemical binding of the fibrous network is achieved at crossover points of the fibers or filaments but occurs primarily at locations of multi-filament accumulations crossed in the different XY planes of superposed layers in the thickness of the product (superposition in the Z direction).

Only the fibers or filaments or the bundles of fibers or filaments that are crossed contribute to the binding. The parallel filaments that are connected to one another or the free monofilament parts of the network consume resin by a coating of the core/sheath type without thereby contributing significantly to the reinforcement of the network.

For its part, the Z bond is made by gluing these strata or layers to one another at corresponding crossover points when they are in contact.

An increase of the thickness of the non-woven product with maintaining of the surface weight necessarily entrains a reduction of the connecting points between layers or strata and therefore a reduction of the structural cohesion and physical and mechanical properties of said product.

The purpose of the invention is in particular to remedy this drawback by proposing the introduction of mineral and/or organic feedstocks that comprise in particular large particles that meet one or more of the dimensional criteria defined above.

The incorporation of particulate feedstocks can be implemented in different ways and in different stages of the production of the non-woven product, based in particular on the type and the method of introduction of the binder.

Advantageously, the introduction of the feedstocks can be implemented at the same time as that of the binder, by impregnation.

In addition, the particulate feedstocks can have different granulometric populations or fractions based on desired additional particulate properties.

The addition of mineral or organic feedstocks in the binding resin (designed to impregnate the non-woven layers) in the form of a mixture of at least two mean granulometric distances makes it possible to artificially increase the size but also and primarily the number of binding points.

The use of grain sizes whose size is on the order of 3 to 10 times larger than those of the diameter of fibers or filaments generally made in the non-woven fabrics (15 to 30 micrometers), or 50 to 150 micrometers for the mineral or organic feedstocks, makes it possible to increase the number of potential binding points by ensuring additional bridgings in the Z-axis.

The small grain sizes with an equivalent diameter of 0.5 to 20 microns increase the size or the weight of the existing binding points statistically naturally.

In particular for the smallest grain sizes, the use of a dispersing agent prevents the re-agglomeration of the particles and thereby works positively in the enhancement of the moduli under hot conditions of the surfaces or products thus constituted.

Based on the density of the mineral feedstock, it is advisable to use—when the grain size increases beyond 30 to 50 µm—a thickening thixotropic agent that prevents sedimentation and ensures a complete dispersion of these loads into the chemical binder and subsequently into the non-woven matrix. This agent that prevents sedimentation is generally not necessary when the feedstocks are of organic origins because of their much lower density (between 0.8 and 1.4). For the very large grain sizes (in particular beyond 100 µm), organic feedstocks are preferably used.

Likewise, and within the framework of the search for an increase of the thickness of the product with a constant surface weight, the use of, for example, thermally expandable microspheres can prove advantageous (see, for example, the document WO 2006/068 574). Nevertheless, their implementation can be done at the expense of a loss of dimensional stability or an increase of the elongations or a reduction of the modulus under cold conditions as well as under hot conditions. Actually, the distances between connecting nodes in the Z-axis increase, reducing all the more the number of cohesion and binding points.

The solution according to the invention with rigid mineral or organic feedstocks in the Z-axis makes it possible to maintain or to limit the level of deformability under hot conditions by a compensation of the lost connecting points, and even to enhance it based on the rate of introduction and the range of flexibility targeted.

In an advantageous way when a significant increase of the surface weight is not necessarily desired, the use of organic feedstocks with a density that is two to three times lower than the mineral feedstocks can prove advantageous. These organic feedstocks can be easily obtained by micronization of polymers such as polyester, polypropylene, or polyamide or all thermoplastic or heat-setting polymers. The grinding of bottle polymers or the recovery of fines obtained from washing and flaking for recycling in these processes makes it possible to economically use materials that are compatible and that have a density that is very close to the polymer that constitutes the non-woven fabric.

By comparison to the intermixing by needling, which makes it possible to orient and to create new crossover and intermixing points that are spaced by 1 to 2 mm in the Z-axis for 30 to 70 perforations per cm$^2$, the integration of 5 g/m$^2$ of feedstocks with a size of 40 to 60 µm (or 2 to 3 times the diameter of the filaments) provides 500 to 6,000 additional points, with potential bonds based on the density of the feedstock, or 10 to 60 points per mm$^2$ of product. This arrangement makes it possible, if necessary, to reduce the number of perforations by needling (this criterion often corresponding to a productivity bottleneck because of limits on the speed with which this technology can make its impact felt).

Figure 1:
FIG. 1 is a photographic view taken with an electron microscope, illustrating the intermixing by needling of a non-woven fabric.

FIG. 1 is a photographic view taken with an electron microscope, illustrating the intermixing by needling of a non-woven fabric.

The chemical binding of non-woven textiles by resins that can be cross-linked is in general done at a dry binder rate in a range of 15 to 30% by weight of the non-woven fabric. A portion of this binder does not contribute to the cohesion and the stability of the product because it also coats the free filaments or the bundles of filaments that are parallel between the connecting nodes. It is possible to estimate that 30% to 50% of the resin thus introduced is ineffective relative to certain desired mechanical properties such as rupture strength, or the moduli under cold conditions or under hot conditions.

Figure 2:
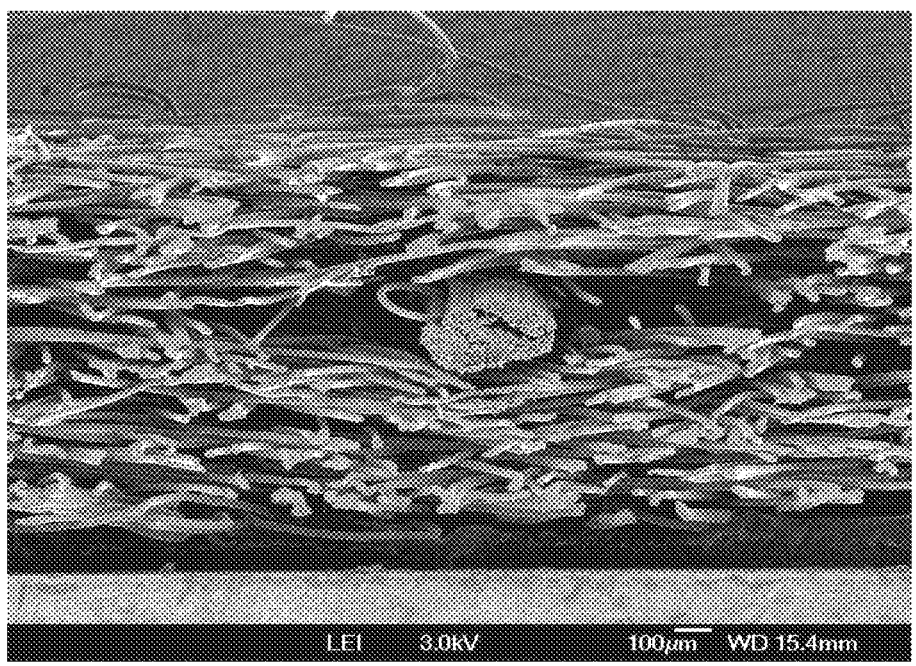
FIG. 2 is a photographic view that is taken with an electron microscope of a cutaway of a non-woven fabric that exists in strata illustrating a distance example of the binder.

FIG. 2 is a photographic view that is taken with an electron microscope of a cutaway of a non-woven fabric that exists in strata illustrating a distance example of the binder.

The use of feedstocks that are suitable in size and in nature and optionally in shape, density and specific properties, makes it possible to increase this yield by reduction of the binder rate or by enhancement of the reinforcement function because of a better synergy with the substrates that are introduced or a larger number of anchoring points.

Figure 3A:
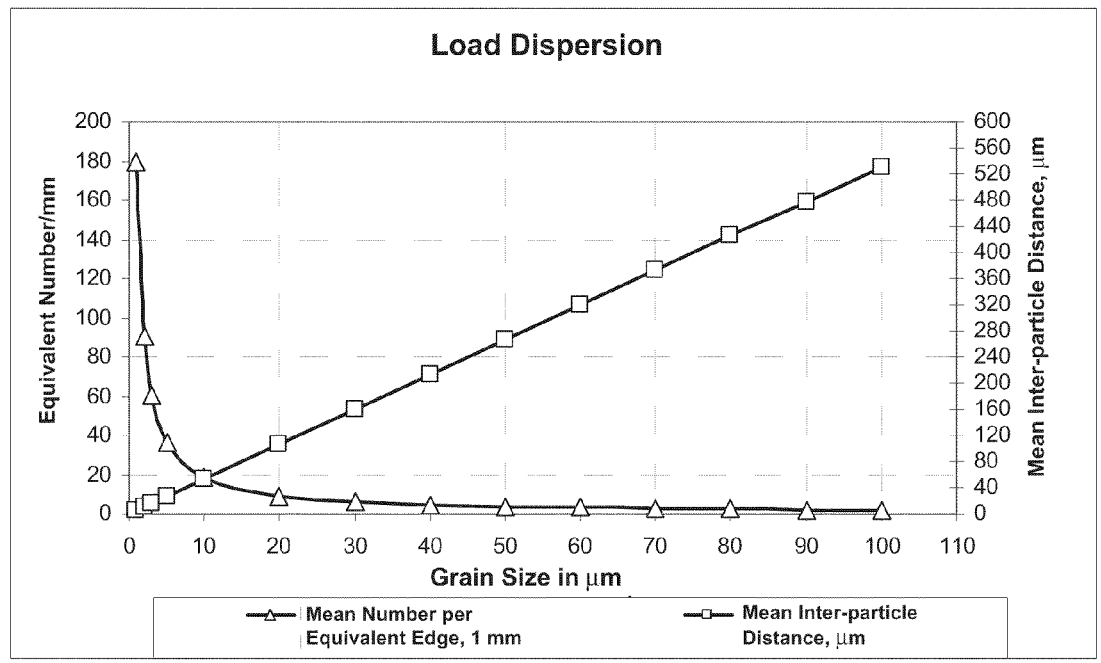
FIG. 3A (load dispersion) and FIG. 3B (mean interfilament distance), illustrate an idealized distance simulation of mineral feedstocks of different grain sizes for a rate of 15 g of feedstock per m$^2$ and for a density of mineral particles of 2.2 (density)
Figure 3B:
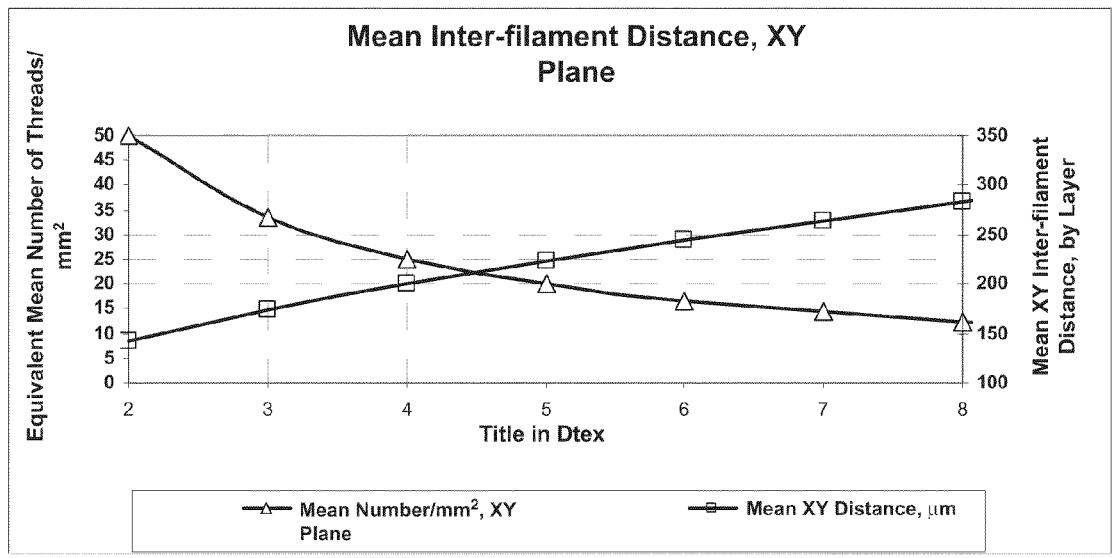

The tables below illustrate, relative to the curves of FIG. 3A (load dispersion) and FIG. 3B (mean interfilament distance), an idealized distance simulation of mineral feedstocks of different grain sizes for a rate of 15 g of feedstock per $m^2$ and for a density of mineral particles of 2.2 (density).

TABLES 1A

Density 2.2 $g/cm^3$
Load/$m^2$ 15 $g/m^2$ Load

| Size in μm | Volume mm3 | Volume cm3 | Weight g/partic | Part Number/$m^2$ of Product | Part Number/$cm^2$ of Product |
|---|---|---|---|---|---|
| 1 | 1.0E−09 | 1.0E−12 | 2.2E−12 | 6.8E+12 | 681 818 182 |
| 2 | 8.0E−09 | 8.0E−12 | 1.8E−11 | 8.5E+11 | 85 227 273 |
| 3 | 2.7E−08 | 2.7E−11 | 5.9E−11 | 2.5E+11 | 25 252 525 |
| 5 | 1.3E−07 | 1.3E−10 | 2.8E−10 | 5.5E+10 | 5 454 545 |
| 10 | 1.0E−06 | 1.0E−09 | 2.2E−09 | 6.8E+09 | 681 818 |
| 20 | 8.0E−06 | 8.0E−09 | 1.8E−08 | 8.5E+08 | 85 227 |
| 30 | 2.7E−05 | 2.7E−08 | 5.9E−08 | 2.5E+08 | 25 253 |
| 40 | 6.4E−05 | 6.4E−08 | 1.4E−07 | 1.1E+08 | 10 653 |
| 50 | 1.3E−04 | 1.3E−07 | 2.8E−07 | 5.5E+07 | 5 455 |
| 60 | 2.2E−04 | 2.2E−07 | 4.8E−07 | 3.2E+07 | 3 157 |
| 70 | 3.4E−04 | 3.4E−07 | 7.5E−07 | 2.0E+07 | 1 988 |
| 80 | 5.1E−04 | 5.1E−07 | 1.1E−06 | 1.3E+07 | 1 332 |
| 90 | 7.3E−04 | 7.3E−07 | 1.6E−06 | 9.4E+06 | 935 |
| 100 | 1.0E−03 | 1.0E−06 | 2.2E−06 | 6.8E+06 | 682 |

| Size in μm | Part Number/$mm^2$ of Surface Area Produced | Part Number/$mm^3$ of Product | Mean Number per Equivalent Edge, 1 mm | Mean Inter-Particle Distance, μm |
|---|---|---|---|---|
| 1 | 6 818 182 | 6 818 182 | 179.9 | 6 |
| 2 | 852 273 | 852 273 | 90.6 | 11 |
| 3 | 252 525 | 252 525 | 60.6 | 16 |
| 5 | 54 545 | 54 545 | 36.6 | 27 |
| 10 | 6 818 | 6 818 | 18.4 | 54 |
| 20 | 852 | 852 | 9.3 | 108 |
| 30 | 253 | 253 | 6.2 | 161 |
| 40 | 107 | 107 | 4.7 | 214 |
| 50 | 55 | 55 | 3.7 | 267 |
| 60 | 32 | 32 | 3.1 | 320 |
| 70 | 20 | 20 | 2.7 | 373 |
| 80 | 13 | 13 | 2.3 | 426 |
| 90 | 9 | 9 | 2.1 | 478 |
| 100 | 7 | 7 | 1.9 | 531 |

TABLE 1B

| | |
|---|---|
| Grammage | 100 $g/m^2$ |
| Thickness | 1 mm |
| Z Layers | 16 Number/mm of Thickness |

"Idealized Cage" Filaments-xx Layers/mm at Z

| Title dTex | Thread Length km/$m^2$ of Product | Thread Length mm/$mm^2$ of Product | Mean Number per Equivalent Edge, 1 mm | Mean Inter-Particle Distance, μm | Mean Number/$mm^2$ XY Plane | Mean XY Distance, μm |
|---|---|---|---|---|---|---|
| 2 | 500 | 500 | 7.8 | 129 | 31.3 | 179 |
| 3 | 333 | 333 | 6.8 | 147 | 20.8 | 219 |
| 4 | 250 | 250 | 6.2 | 162 | 15.6 | 253 |
| 5 | 200 | 200 | 5.7 | 174 | 12.5 | 283 |
| 6 | 167 | 167 | 5.4 | 185 | 10.4 | 310 |
| 7 | 143 | 143 | 5.1 | 194 | 8.9 | 335 |
| 8 | 125 | 125 | 4.9 | 203 | 7.8 | 358 |
| 9 | 111 | 111 | 4.7 | 211 | 6.9 | 379 |
| 10 | 100 | 100 | 4.6 | 219 | 6.3 | 400 |

Examples 1 to 4 below illustrate different variant embodiments of a non-woven product according to the prior art (Example 1) and according to the invention (Examples 2 to 4).

Example 1

Without Particulate Feedstocks

A surface of continuous polyester filaments of 6.0 dtex was prepared at two levels of surface weight 125 and 155 $g/m^2$ following a so-called "spunbond" process. It was the object of a reinforcement by glass threads of 68 Tex introduced at the center of the layer according to the processes described by the document FR 88 16711.

The process described in FR 88 16711 includes producing a nonwoven filament sheet from extruded polyethylene terephthalate and polybutylene terephthalate threads. Glass thread fiber is incorporated continuously every 1.5 cm of the sheet at the time of coating. Threads are fed from reels mounted on a creel. The polyester sheet+glass threads composite is needled with sing 40 RB needles (40 gauge, regular barbs), 50 perforations/cm², 12 mm penetration. On leaving the needler, the sheet is calendered 235° C. under a pressure of 25 daN/cm at a calendar speed of 13 m/min, S pass and a total time of contact between the sheet and rolls of 15 seconds, followed by a pass over cooling rolls.

These surfaces were then linked hydraulically at a speed of 20 m/minute, at a rate of once per face, and at four different pressure levels from 130 to 210 bar using nozzles of 130 μm in diameter, whereby the openings are separated by 0.8 mm. These tests are numbered from E1 to E8 in Table 2 below.

These surfaces were then taken up and impregnated in a full bath using a binder that consists of 88% of an acrylic resin and 12% of a melamine in dilution at 70% at a speed of 12 m/min. The binder was dried and then cross-linked at a temperature of 215° C. on a first drum and at 135° C. on a second drum in series.

The carrying level was adjusted in such a way that it varies theoretically in a range of 12 to 24% dry relative to the weight of the non-woven fabric (these tests are numbered E1.1 to E1.1.2 in the tables below).

TABLES 2

| Test No. | Speed (m/min) | Initial Surface Weight (g/m²) | HE Injector Pressure (Bar) | Resin Level % | Final Surface Weight (g/m²) | Thickness (mm) |
|---|---|---|---|---|---|---|
| E1 | 20 | 126 | 150 | 0.0 | 126 | 1.09 |
| E2 | 20 | 126 | 130 | 0.0 | 126 | 0.93 |
| E3 | 20 | 123 | 180 | 0.0 | 123 | 1.02 |
| E4 | 20 | 126 | 210 | 0.0 | 126 | 0.94 |
| E5 | 20 | 157 | 130 | 0.0 | 157 | 1.27 |
| E6 | 20 | 158 | 150 | 0.0 | 158 | 1.16 |
| E7 | 20 | 155 | 180 | 0.0 | 155 | 1.15 |
| E8 | 20 | 158 | 200 | 0.0 | 158 | 1.12 |
| E1.1 | 12 | 126 | 150 | 14.9 | 148 | 1.20 |
| E2.1 | 12 | 126 | 130 | 14.9 | 148 | 1.15 |
| E3.1 | 12 | 123 | 180 | 14.9 | 150 | 0.92 |
| E4.1 | 12 | 126 | 210 | 14.9 | 146 | 0.89 |
| E5.1 | 12 | 157 | 130 | 17.4 | 190 | 1.33 |
| E6.1 | 12 | 158 | 150 | 16.0 | 188 | 1.23 |
| E7.1 | 12 | 155 | 180 | 12.6 | 189 | 1.17 |
| E8.1 | 12 | 158 | 200 | 15.5 | 187 | 1.11 |
| E1.1.1 | 12 | 126 | 150 | 18.2 | 153 | 1.10 |
| E1.1.2 | 12 | 126 | 150 | 23.6 | 165 | 1.08 |

| Test No. | Longitudinal Direction of Glass Thread Failure N | Longitudinal Direction of Glass Thread Elongation at Break (%) | Longitudinal Direction of Failure Load N | Transverse Direction of Failure Load N |
|---|---|---|---|---|
| E1 | 127 | 2.1 | 527 | 326 |
| E2 | 128 | 1.9 | 525 | 366 |
| E3 | 144 | 2.4 | 575 | 358 |
| E4 | 144 | 2.2 | 480 | 335 |
| E5 | 133 | 2.2 | 645 | 422 |
| E6 | 177 | 2.1 | 673 | 440 |
| E7 | 192 | 1.8 | 712 | 456 |
| E8 | 155 | 2.4 | 740 | 427 |
| E1.1 | 350 | | 599 | 342 |
| E2.1 | 370 | | 609 | 328 |
| E3.1 | 360 | | 600 | 363 |
| E4.1 | 340 | | 590 | 357 |
| E5.1 | 390 | | 778 | 444 |
| E6.1 | 393 | | 778 | 427 |
| E7.1 | 408 | | 746 | 457 |
| E8.1 | 384 | | 763 | 462 |
| E1.1.1 | 311 | | 541 | 347 |
| E1.1.2 | 413 | | 613 | 365 |

| Test No. | SL/ST Isotropy / | (SL + ST)/2 Mean Failure Load N | SL Elongation at Break (%) | ST Elongation at Break (%) |
|---|---|---|---|---|
| E1 | 1.62 | 427 | 52.7 | 70.6 |
| E2 | 1.43 | 446 | 52.5 | 66.4 |
| E3 | 1.61 | 467 | 51 | 63.6 |
| E4 | 1.43 | 408 | 52.3 | 64.3 |
| E5 | 1.53 | 534 | 55.7 | 68 |
| E6 | 1.53 | 557 | 51.8 | 65.1 |
| E7 | 1.56 | 584 | 50.6 | 64.8 |
| E8 | 1.73 | 584 | 53.1 | 64.4 |
| E1.1 | 1.75 | 470.5 | 32.7 | 37.1 |

TABLES 2-continued

| | | | | |
|---|---|---|---|---|
| E2.1 | 1.86 | 468.5 | 31.5 | 34.3 |
| E3.1 | 1.65 | 481.5 | 32.9 | 37.5 |
| E4.1 | 1.65 | 473.5 | 30.9 | 37.3 |
| E5.1 | 1.75 | 611 | 34.9 | 40.7 |
| E6.1 | 1.82 | 603 | 35.5 | 40.6 |
| E7.1 | 1.63 | 602 | 32.3 | 42.3 |
| E8.1 | 1.65 | 613 | 34.5 | 42 |
| E1.1.1 | 1.56 | 444 | 29.5 | 38.5 |
| E1.1.2 | 1.68 | 489 | 30.2 | 35.4 |

The results of the different properties were modeled by a polynomial method of degree two so as to be implemented. It appears that beyond a binding resin level of 14% to 16%, the mechanical properties of the non-woven fabric virtually no longer change, demonstrating a very low effectiveness of the resin, nevertheless necessary for ensuring an adequate cohesion at the multifilament junction/crossover point of the polyester filament network. It appears that nearly 50% of the resin primarily coats the outer-nodes/crossover filaments of the network. The multiplication of these nodes thus makes it possible either to minimize the resin level or to improve the mechanical properties, or to decouple the properties of the nonwoven fabrics relative to the carrying level. A slightly more important contribution of the resin level appears for the higher surface weights because of the multiplication of these crossover points. Cohesion with the glass thread reinforcement remains low according to electron microscopy observation.

Figure 4:
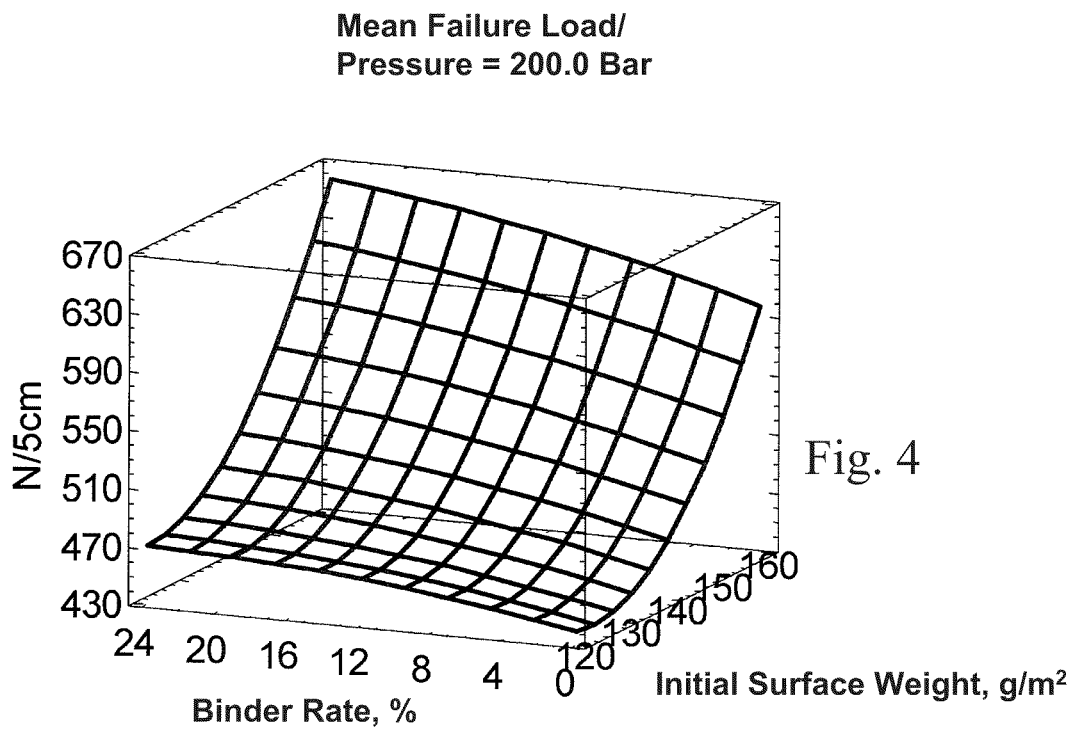
FIGS. 4 and 5 respectively illustrate resistance to elongation (FIG. 4) and the stretching modulus (FIG. 5)
Figure 5:
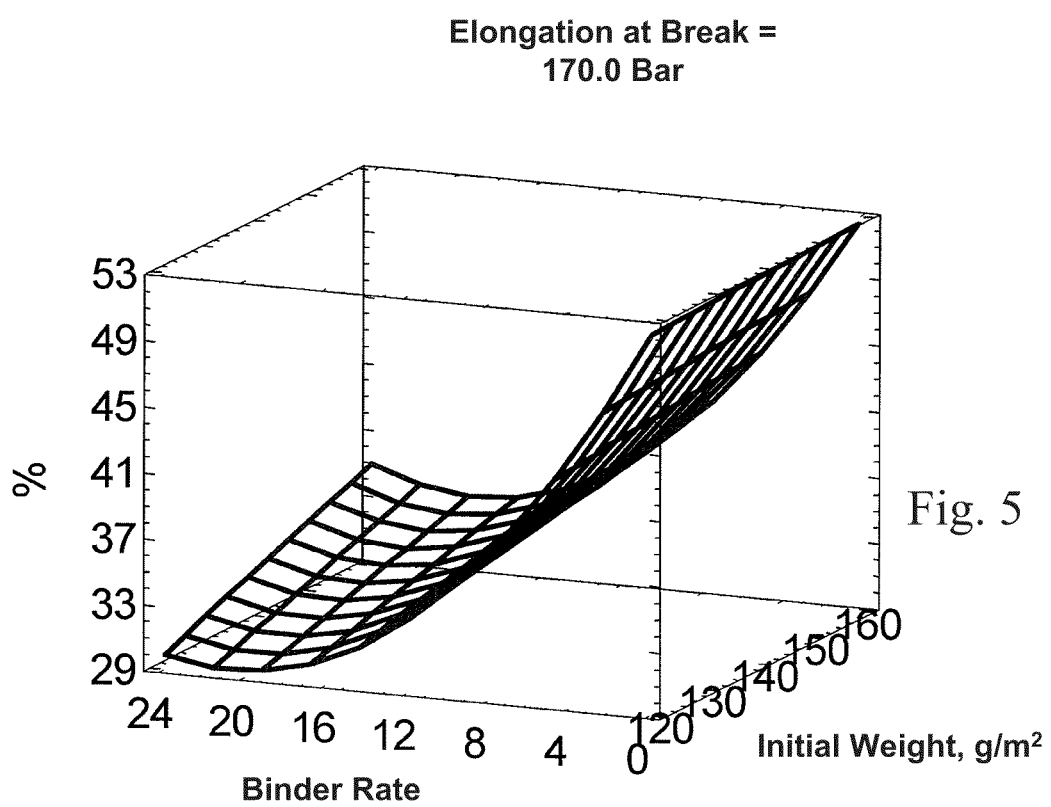

FIGS. 4 and 5 of the accompanying drawings respectively illustrate resistance to elongation (FIG. 4) and the stretching modulus (FIG. 5).

Example 2

With Particulate Feedstocks

A surface of continuous polyester filaments of 7.0 dtex was prepared according to a "spunbond" process without reinforcement by substrates of very high moduli.

The polymer that is used is a 100% recycled PET of the "bottle flakes" type (flakes of recycled plastic bottles) of Q5 quality.

These surfaces were connected mechanically by needling at a rate of:

50 perforations/cm$^2$ 12 mm of penetration

Using 15×18×38 needles of the "regular barb" type before being heat-set at 210° C. starting from a heated calender, and then impregnated using a variable mixture of calcium carbonate and the same acrylic binder as Example 1, this at a speed of 40 m/min.

The binder was dried and then cross-linked at a temperature of 217° C. on a drum of 3.6 m in diameter through which air passes.

The carrying level was adjusted theoretically to a variable level of 21% to 27% dry relative to the weight of the nonwoven fabric.

These tests are numbered 1 to 6 in Tables 3 and 4 below.

The calcium carbonate is in the form of an Omyalite 60 liquid mud ("slurry") of d50% to 1.5 µm.

TABLE 3

| Test | PET + Resin g/m$^2$ | Mineral Feedstock g/m$^2$ | Surface Weight g/m$^2$ | % Feedstock | % Resin |
|---|---|---|---|---|---|
| 1 | 230 | 16 | 246 | 5.2 | 15.5 |
|   | 232 | 16 | 248 | 5.3 | 16.0 |
| 2 | 234 | 31 | 265 | 10.6 | 15.8 |
|   | 231 | 31 | 262 | 10.2 | 15.3 |
| 3 | 232 | 45 | 277 | 14.8 | 14.8 |
|   | 230 | 45 | 275 | 14.5 | 14.5 |
| 4 | 204 | 38 | 242 | 18.0 | 18.0 |
|   | 204 | 38 | 242 | 18.0 | 18.0 |
| 5 | 225 | 30 | 255 | 12.5 | 18.8 |
|   | 218 | 29 | 247 | 11.7 | 17.5 |
| 6 | 215 | 14 | 229 | 8.1 | 24.2 |
|   | 210 | 14 | 224 | 7.7 | 23.1 |

TABLES 4

| Test | Thickness mm | Density / | (SL/ST) Isotropy of Failure Load / | (SL/ST) Mean Failure Load N | (SL + ST) Mean Elongation at Break % |
|---|---|---|---|---|---|
| 1 | 1.45 | 0.170 | 1 | 799 | 32 |
|   | 1.48 | 0.168 | 1.06 | 779 | 30 |
| 2 | 1.38 | 0.192 | 0.98 | 814 | 31 |
|   | 1.43 | 0.183 | 1.1 | 786 | 28 |
| 3 | 1.48 | 0.187 | 1.07 | 799 | 29 |
|   | 1.50 | 0.183 | 1.07 | 791 | 30 |
| 4 | 1.17 | 0.207 | 1.07 | 675 | 34 |
|   | 1.18 | 0.205 | 1.28 | 676 | 32 |
| 5 | 1.31 | 0.195 | 1.01 | 715 | 30 |
|   | 1.28 | 0.193 | 1.18 | 708 | 29 |
| 6 | 1.12 | 0.204 | 1.15 | 674 | 32 |
|   | 1.13 | 0.198 | 1 | 665 | 33 |

| | Free Shrinkage at 200° C. | | 200° C. Creep under 80 N | |
|---|---|---|---|---|
| Test | % SL | % ST | % SL | % ST |
| 1 | −0.7 | −0.3 | 1.7 | −2.0 |
|   | −0.9 | −0.2 | 1.5 | −2.3 |
| 2 | −1.0 | −0.5 | 1.5 | −2.0 |
|   | −0.9 | −0.4 | 1.4 | −1.8 |
| 3 | −1.1 | −0.3 | 1.5 | −1.7 |
|   | −1.1 | −0.5 | 1.6 | −1.3 |
| 4 | −1.0 | −0.4 | 2.7 | −2.3 |
|   | −1.0 | −0.2 | 2.8 | −2.3 |
| 5 | −1.1 | −0.5 | 2.5 | −2.4 |
|   | −1.1 | −0.4 | 2.0 | −2.1 |
| 6 | −1.2 | −0.5 | 2.8 | −2.5 |
|   | −1.2 | −0.4 | 2.4 | −2.5 |

The mechanical properties have been modeled by second-order polynomials respectively based on the mass of g/m$^2$ of the non-woven fabric+resin unit and the additional supply of CaCO$_3$ filler.

The failure load does not appear to be sensitive to the reinforcement of mineral feedstock but only to the mass of non-woven fabric+resin. In contrast, a noteworthy enhancement of the shrinkage under stress is noted in the transverse direction. This mechanism is explained primarily by the reinforcement as well as by the increase in size of the binding points that contribute to the reduction of the deformability by the addition by mass of the mineral feedstock without thereby providing additional cohesion points because of the very small size of the particles that are introduced 10 to 15 times smaller than the diameter of the filaments. This is also verified for the cold deformation under 50N.

The carrying level of resin can be considerably reduced without thereby essentially affecting the mechanical properties and the hot deformability of the thus produced surface.

Figure 6:
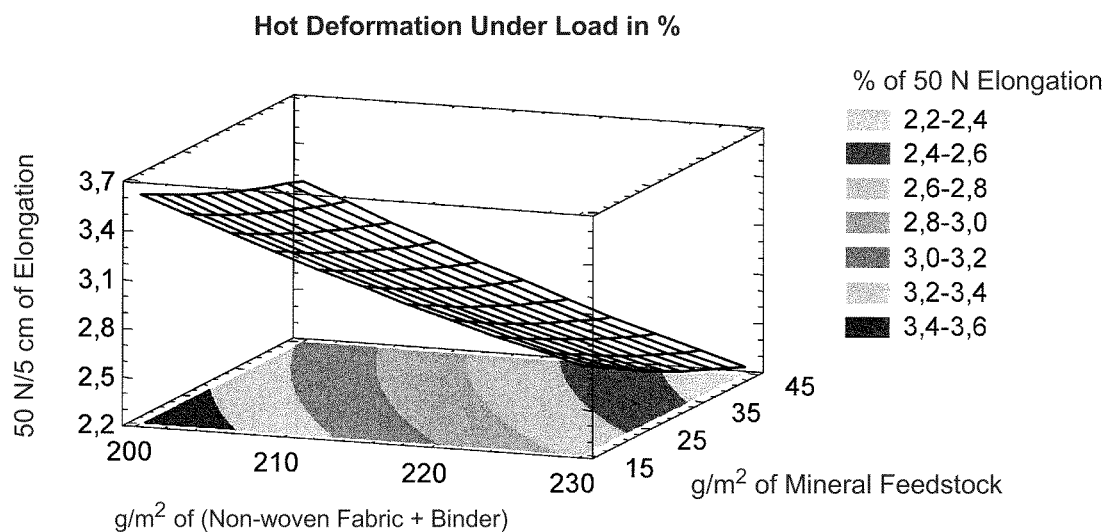
FIGS. 6 and 7 illustrate the elongation curves at 50 N (FIG. 6) and the creep (FIG. 7) of the non-woven products that are produced according to Example 2.
Figure 7:
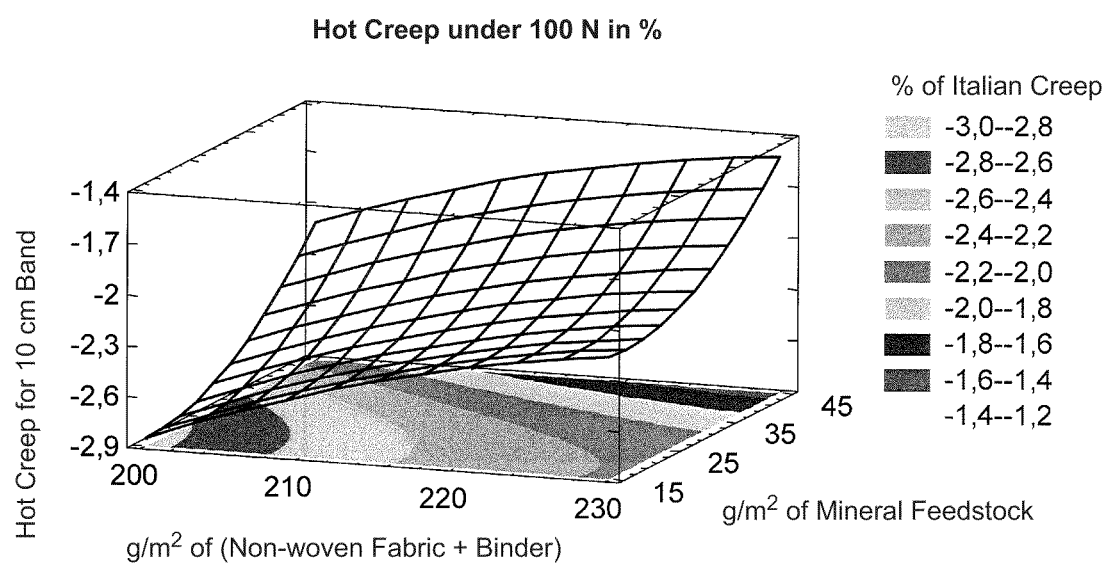
Figure 8:
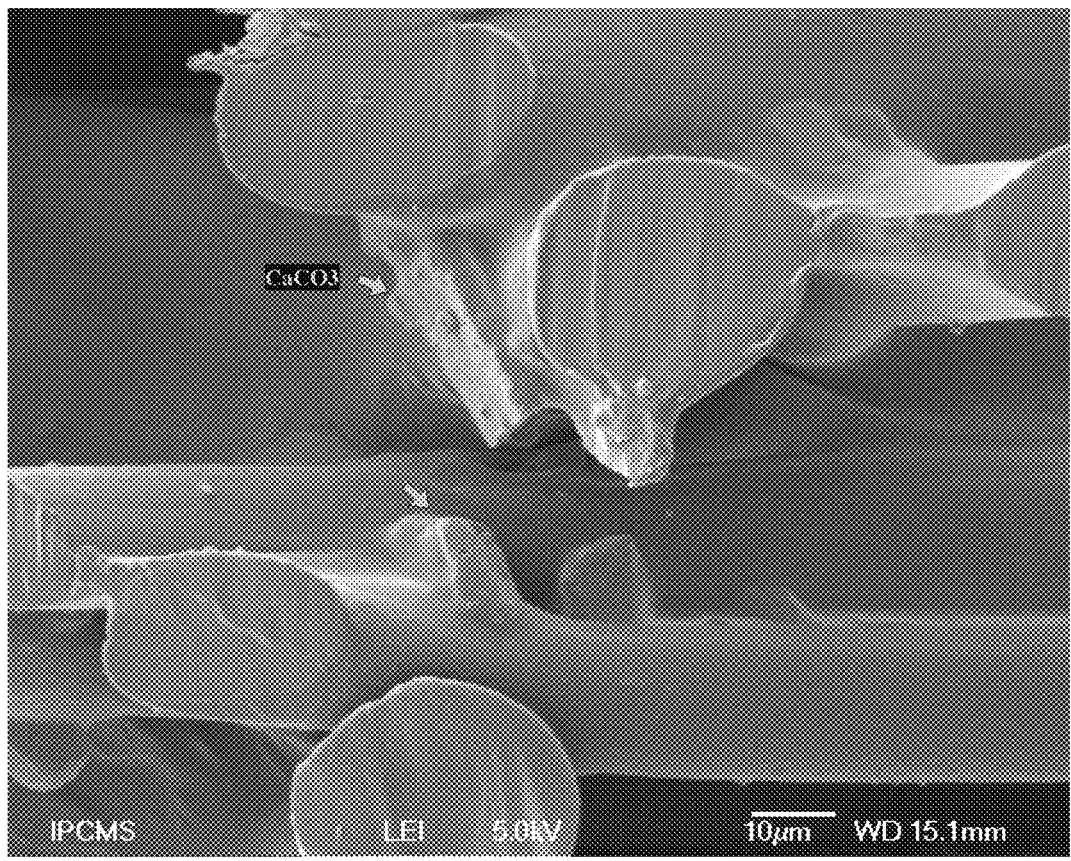
FIG. 8 is a photographic cutaway view of a non-woven product consistent with Example 2.

FIGS. 6 and 7 illustrate the elongation curves at 50 N (FIG. 6) and the creep (FIG. 7) of the non-woven products that are produced according to Example 2, and FIG. 8 is a photographic cutaway view of a non-woven product consistent with Example 2.

Example 3

A surface of continuous polyester filaments of 7.0 dtex was prepared under the same conditions as Example 2, still starting from 100% recycled PET polymer "bottle flakes" (recycled bottle flakes) of quality Q5.

The needling bond as well as the heat-setting and the conditions of impregnation and drying/cross-linking are similar to the preceding example.

The basic surface weight of the non-woven fabric is 195 g/m². The carrying level was theoretically adjusted to a variable level of 21% to 27% under dry conditions relative to the weight of the non-woven fabric. These tests are numbered 1 to 4 in Tables 5 and 6 below.

The inert feedstocks that are introduced according to the tests consist of mixtures of particles that are determined as indicated.

Calcium carbonate is an Omyalite 60 liquid mud (slurry) of d50% at 1.5 μm and a Durcal 130 of d50% at 170 μm.

The feedstock of polymer particles is produced from the recovery of fines of sieved "bottle flake" fractions (recycled bottle particles) whose grain size spectrum is between 2 and 400 μm.

So as to prevent the sedimentation of the mineral feedstocks of large grain size, a thixotropic suspending agent was introduced at a dry level of 0.5% of the acrylic resin level.

The solid fines of polyester were washed and dried in advance in the presence of a surfactant that makes it possible to prevent their reagglomeration in the binder.

TABLES 5

| Composition of Feedstock | | | Product | | | |
|---|---|---|---|---|---|---|
| | | | BiMoTiXo001 20 g/m² of Slurry | | BiMoTiXo002 10 + 10 g/m² of Slurry + Durcall | |
| Coil No. | | | 26 | 27 | 28 | 29 |
| Total Level | | (%) | 29 | 27.0 | 34.5 | 34.5 |
| Resin Level | | (%) | 19 | 18 | 18 | 18 |
| Resin Mass | | (g/m²) | 38 | 36 | 36 | 36 |
| Feedstock Mass | | (g/m²) | 19 | 18 | 33 | 33 |
| Resin + Feedstock Mass | | (g/m²) | 57 | 54 | 69 | 69 |
| PET + Resin Mass | | (g/m²) | 238 | 236 | 236 | 236 |
| Distribution | | (g/m²) | 257 | 254 | 269 | 269 |
| Thickness | | (mm) | 1.48 | 1.45 | 1.50 | 1.51 |
| Density | | / | 0.174 | 0.175 | 0.179 | 0.178 |
| Failure Load | SL | (N) | 801 | 843 | 816 | 831 |
| Failure Load | ST | (N) | 721 | 703 | 741 | 740 |
| Isotropy | SL/ST | / | 1.09 | 1.20 | 1.10 | 1.12 |
| Load | L + T/2 | (N) | 761 | 773 | 779 | 786 |

TABLES 5-continued

| | | | | | | |
|---|---|---|---|---|---|---|
| Load Weighted at 230 g/m² | | (N) | 737 | 754 | 757 | 764 |
| Elongation | SL | (%) | 28.5 | 29.9 | 28.2 | 28.2 |
| Elongation | ST | (%) | 29.6 | 28.9 | 28.3 | 29.1 |

| | | | Product | |
|---|---|---|---|---|
| Feedstock Composition | | | BiMoTiXo003 20 g/m² of Durcal | BiMoTiXo004 12 + 8 g/m² of Slurry + PET |
| Coil No. | | | 32 | 33 | 34 | 35 |
| Total Level | | (%) | 26.5 | 29.5 | 25.5 | 28.5 |
| Resin Level | | (%) | 17 | 19 | 17 | 19 |
| Resin Mass | | (g/m²) | 35 | 39 | 34 | 38 |
| Feedstock Mass | | (g/m²) | 18 | 20 | 17 | 19 |
| Resin + Feedstock Mass | | (g/m²) | 53 | 59 | 51 | 57 |
| PET + Resin Mass | | (g/m²) | 235 | 239 | 234 | 238 |
| Distance | | (g/m²) | 253 | 259 | 251 | 257 |
| Thickness | | (mm) | 1.52 | 1.54 | 1.50 | 1.52 |
| Density | | / | 0.166 | 0.168 | 0.167 | 0.169 |
| Failure Load | SL | (N) | 805 | 814 | 788 | 801 |
| Failure Load | ST | (N) | 717 | 739 | 712 | 730 |
| Isotropy | SL/ST | / | 1.12 | 1.10 | 1.11 | 1.10 |
| Load | L + T/2 | (N) | 761 | 777 | 750 | 766 |
| Load Weighted at 230 g/m² | | (N) | 745 | 747 | 738 | 741 |
| Elongation | SL | (%) | 28.0 | 27.5 | 28.0 | 26.6 |
| Elongation | ST | (%) | 28.1 | 30.3 | 26.3 | 27.7 |

| Feedstock Composition | | | Product 230 THC / | |
|---|---|---|---|---|
| Coil No. | | | 16 | 17 |
| Total Level | | (%) | 21.0 | 23.0 |
| Resin Level | | (%) | 21 | 23 |
| Resin Mass | | (g/m²) | 42 | 46 |
| Feedstock Mass | | (g/m²) | 0 | 0 |
| Resin + Feedstock Mass | | (g/m²) | 42 | 46 |
| PET + Resin Mass | | (g/m²) | 242 | 246 |
| Distance | | (g/m²) | 242 | 246 |
| Thickness | | (mm) | 1.43 | 1.46 |
| Density | | / | 0.169 | 0.168 |
| Failure Load | SL | (N) | 802 | 822 |
| Failure Load | ST | (N) | 750 | 756 |
| Isotropy | SL/ST | / | 1.07 | 1.09 |
| Load | L + T/2 | (N) | 776 | 789 |
| Load Weighted at 230 g/m² | | (N) | 738 | 738 |
| Elongation | SL | (%) | 31.2 | 30.3 |
| Elongation | ST | (%) | 32.6 | 31.9 |

TABLES 6

200° C. Hot Dynamometries Weighted at 230 g/m²

| | | | Product | |
|---|---|---|---|---|
| Feedstock Composition | | | BiMoTiXo001 20 g/m² of Slurry | BiMoTiXo002 10 + 10 g/m² of Slurry + Durcall |
| Coil No. | | | 26 | 27 | 28 | 29 |
| PET + Resin Mass | | (g/m²) | 238 | 236 | 236 | 236 |
| 10 N Elongation | SL | (%) | 0.72 | 0.66 | 0.68 | 0.63 |
| 50 N Elongation | SL | (%) | 3.6 | 3.3 | 3.4 | 3.2 |
| 80 N Elongation | SL | (%) | 6.0 | 5.5 | 5.7 | 5.3 |
| 100 N Elongation | SL | (%) | 7.8 | 6.9 | 7.1 | 6.5 |

| | | | Product | |
|---|---|---|---|---|
| Feedstock Composition | | | BiMoTiXo003 20 g/m² of Durcal | BiMoTiXo004 12 + 8 g/m² of Slurry + PET |
| Coil No. | | | 32 | 33 | 34 | 35 |
| PET + Resin Mass | | (g/m²) | 235 | 239 | 234 | 238 |

TABLES 6-continued

| 200° C. Hot Dynamometries Weighted at 230 g/m² | | | | | |
|---|---|---|---|---|---|
| 10 N Elongation | SL | (%) | 0.63 | 0.64 | 0.66 | 0.63 |
| 50 N Elongation | SL | (%) | 3.2 | 3.2 | 3.3 | 3.2 |
| 80 N Elongation | SL | (%) | 5.2 | 5.4 | 5.5 | 5.2 |
| 100 N Elongation | SL | (%) | 6.5 | 6.6 | 6.9 | 6.5 |

| Feedstock Composition | | | Product 230 THC / | |
|---|---|---|---|---|
| Coil No. | | | 16 | 17 |
| PET + Resin Mass | | (g/m²) | 242 | 246 |
| 10 N Elongation | SL | (%) | 0.68 | 0.67 |
| 50 N Elongation | SL | (%) | 3.4 | 3.3 |
| 80 N Elongation | SL | (%) | 5.7 | 5.6 |
| 100 N Elongation | SL | (%) | 7.1 | 6.8 |

It appears that the introduction of mineral or polymer feedstocks makes it possible to reduce the carrying level of resin while maintaining or enhancing the mechanical or dimensional stability properties.

A mixture of two grain sizes proves to be superior in failure load to the use of a single population of small grain size as well as in comparison of the product without loads, with carrying levels of resin that are significantly lower.

The bridgings of large particles in the XY and Z planes make it possible to decouple the often desired stability properties with increased thickness.

Figure 9:
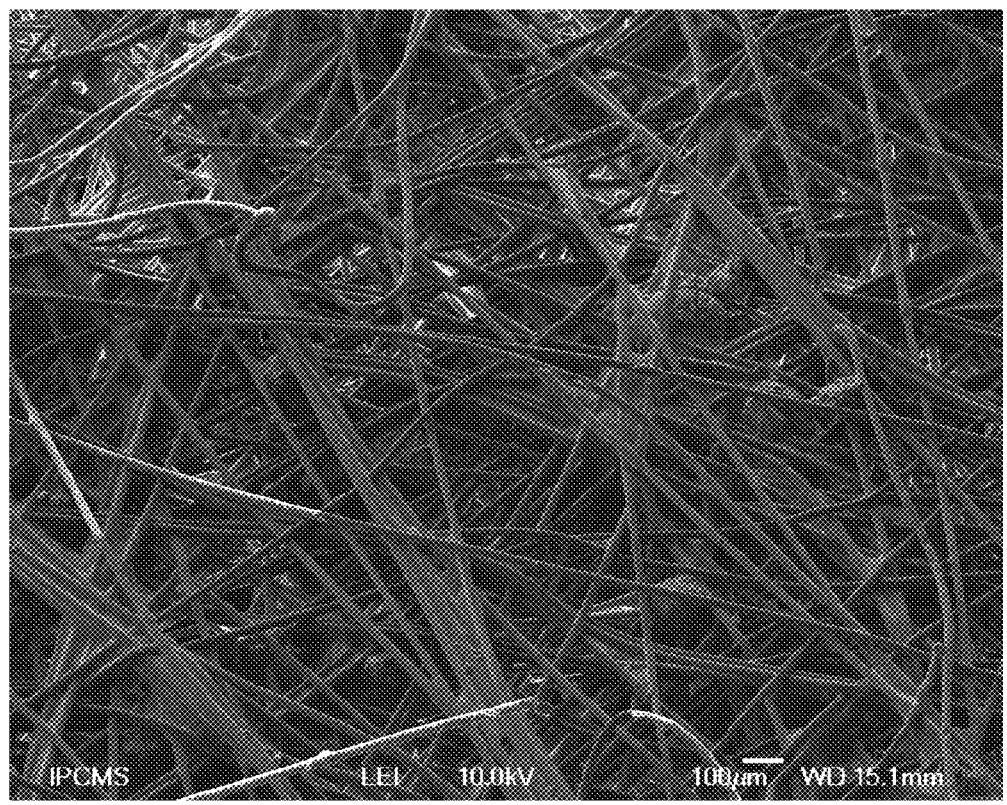
FIGS. 9 and 10 are photographic views that are taken with electron microscopy, with different magnifications, illustrating the bridgings obtained with the large particles and the relative size of the latter relative to the filaments and the pores of the non-woven fabric.
Figure 10:
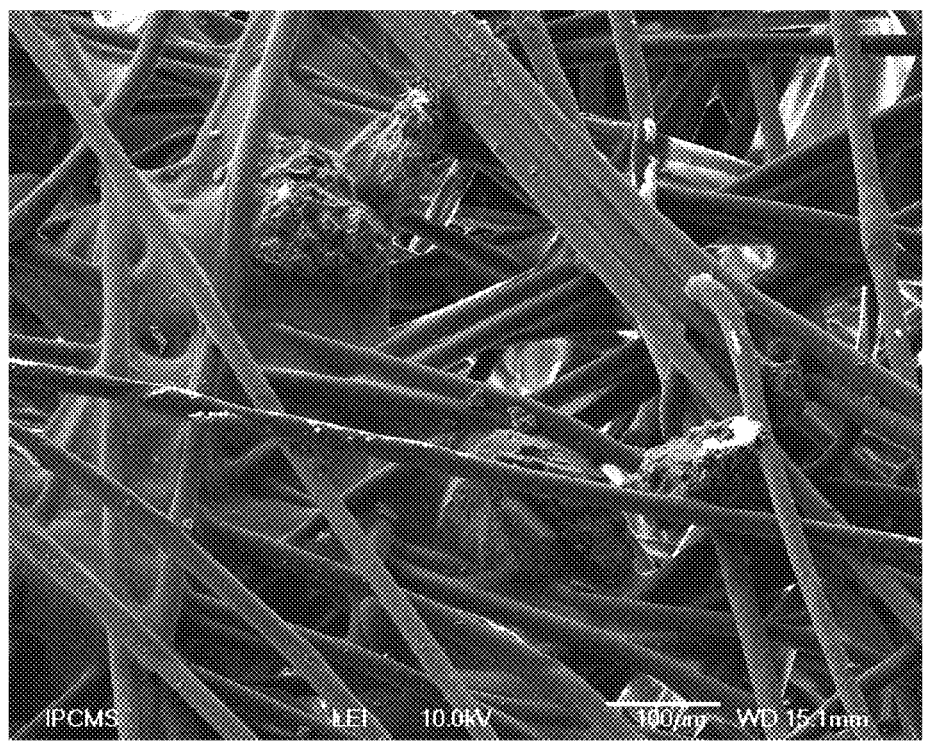

FIGS. 9 and 10 are photographic views that are taken with electron microscopy, with different magnifications, illustrating the bridgings that are obtained with the large particles and the relative size of the latter relative to the filaments and the pores of the non-woven fabric.

Example 4

Surfaces of non-woven fabrics composed of short polyester fibers of 6.5 dtex with surface weights on the order of 110 g/m² and 120 g/m² have been prepared according to a dry process. They were the subject of a reinforcement by glass threads of 68 Tex that were introduced into the center of the layer according to the processes described by document FR 88 16711.

Several samples of these surfaces were then taken up and impregnated in a full bath using a binder that consists of 70% of an acrylic resin and 30% of a melamine in dilution in water at 77.5% at a speed of 2.5 m/min. The binder was dried and then cross-linked in a furnace at a temperature of 215° C. for 3 minutes.

The carrying level was adjusted in such a way that it is theoretically in a range of 22 to 24% dry relative to the initial weight of the non-woven fabric. The expressing is done by a pad mangle at 3.5 bar of tightening pressure for all of the tests.

In comparison tests, this same binder was the object of the dry addition of 25% of the resin of a particulate feedstock in the form of calcium carbonate with a mean grain size of d50% to 130 μm or micronized polyethylene with a grain size of 100 μm to 300 μm.

The treatment of these comparison tests is similar to the control without additional feedstock.

The longitudinal behavior of the final surface was tested under cold conditions and under hot conditions at a temperature of 180° C.

The results that are obtained by these tests appear in Tables 7 and 8 below:

TABLE 7

| Tests under Cold Conditions | | Control | Carb Calc | PE micro |
|---|---|---|---|---|
| Surface Weight | g/m2 | 147 | 138 | 140 |
| Thickness | mm | 1.67 | 1.46 | 1.46 |
| Density | / | 0.088 | 0.094 | 0.096 |
| Failure Load - Glass Thread - SL | N/50 mm | 387 | 371 | 358 |
| SL Elongation at Break - Glass Thread | % | 3.5 | 3.2 | 3.3 |
| Load/2% Elongation - SL | N/50 mm | 216 | 240 | 227 |
| Normalized Durability | daN/50 mm/gm2 | 0.26 | 0.27 | 0.26 |
| SL Failure Load | N/50 mm | 189 | 177 | 190 |
| SL Elongation at Break | % | 20.0 | 21.9 | 21.1 |
| SL Failure Energy | J/mm3 | 0.41 | 0.48 | 0.49 |
| Young E Modulus | MPa | 151 | 172 | 169 |

TABLE 8

| Tests under Hot Conditions 180° C. | | Control | Carb Calc | PE micro |
|---|---|---|---|---|
| Surface Weight | g/m2 | 141 | 140 | 133 |
| Failure Load - Glass Thread - SL | N/50 mm | 95 | 80 | 89 |
| SL Elongation at Break - Glass Thread | % | 2.2 | 2.0 | 2.2 |
| Deformation @ 50 N | % | 1.11 | 1.05 | 1.16 |
| Deformation @ 80 N | % | 1.69 | 1.83 | 1.86 |
| Normalized Durability | daN/50 mm/gm2 | 0.07 | 0.06 | 0.07 |
| SL Failure Load | N/50 mm | 67 | 68 | 73 |
| SL Elongation at Break | % | 95.5 | 92.6 | 65.5 |
| Young E Modulus | MPa | 62 | 63 | 64 |

An excellent synergy of mineral or organic feedstocks with the glass reinforcement filaments as well as a significant enhancement of the modulus both under cold conditions and under 180° C. relative to the control are noted.

Despite a lower surface weight for the loaded products, the failure and deformability energy appear identical, or even better.

Moreover, for the same operating conditions, the feedstocks that are introduced make it possible to obtain a smaller thickness of the product that is linked to a lesser relaxation of the network. The polyethylene feedstocks make it possible to point-imprison numerous filaments, thus very significantly modifying the mechanical hot-deformation behavior of the fibrous network despite their introduction into a cross-linkable binder.

These feedstocks also make it possible to decouple the physico-mechanical properties of the structure of the non-woven fabric without thereby losing dimensional stability in the desired fields.

Figure 11:
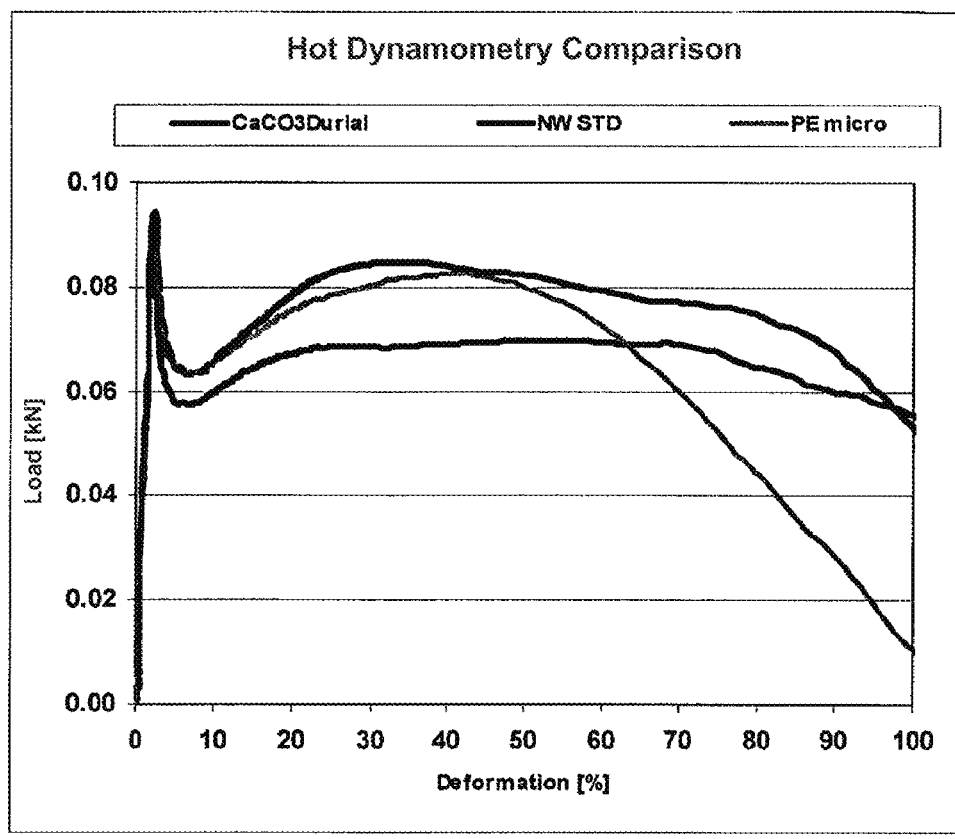
FIG. 11 shows the results of the hot dynamometry tests (deformation/load curves) that also emerge from Table 8.
Figure 12:
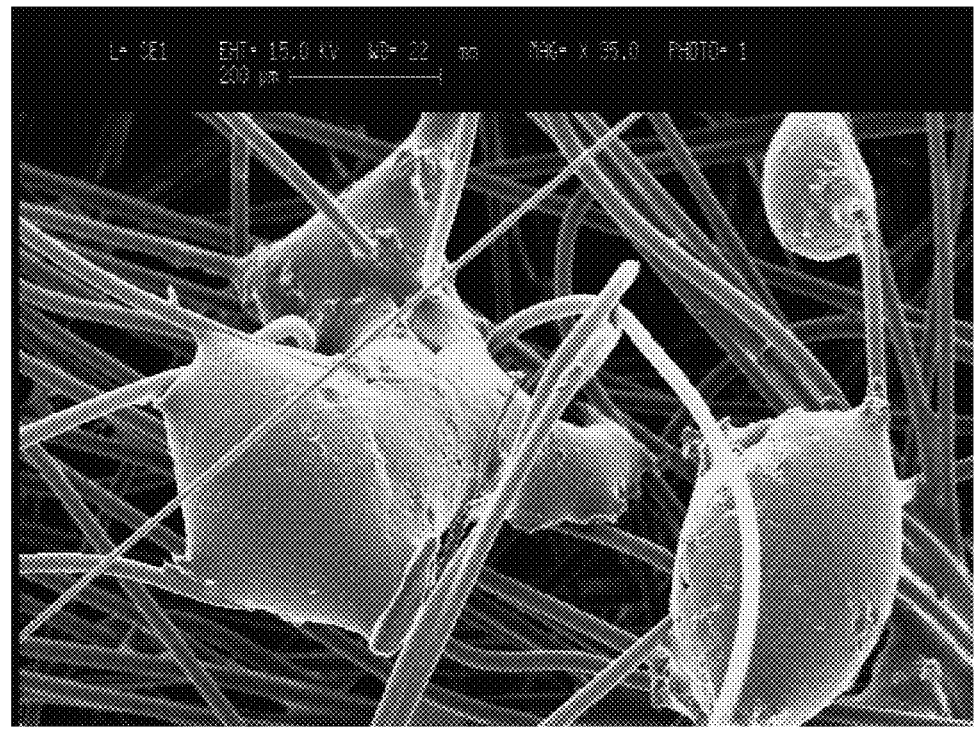
FIG. 12 is an electron-microscopic photographic view of a sample according to Example 4, illustrating the bridging sites that result from the presence of large particles (polyethylene+ acrylic binder feedstocks after cross-linking).

In the form of curves, FIG. 11 shows the results of the hot dynamometry tests (deformation/load curves) that also emerge from Table 8, and FIG. 12 is an electron-microscopic photographic view of a sample according to Example 4, illustrating the bridging sites that result from the presence of large particles (polyethylene+acrylic binder feedstocks after cross-linking).

Of course, the invention is not limited to the embodiments that are described and shown in the accompanying drawings. Modifications remain possible, in particular from the standpoint of the composition of the various elements or by substitution of equivalent techniques, without thereby exceeding the scope of protection of the invention.

The invention claimed is:

1. A flexible non-woven product that has a density that is less than 1 g/cm³ and that is formed by at least two layers of synthetic fibers or filaments superposed in a Z direction that is perpendicular to a XY plane of said product, having undergone at least one mechanical or hydraulic needling operation, whereby said non-woven product also integrates particulate feedstocks in a form of rigid particles distributed in a monomodal or multimodal manner in the product and is at least partially coated or encapsulated by a binding material that can provide connecting points between the filaments or fibers to one another, physical and mechanical properties of the flexible non-woven product being affected by size and number of the connecting points and the binding material, the rigid particles comprising mineral particles, a particle density of the mineral particles being between 1.6 to 4.2 g/cm$^3$, the flexible non-woven product being adapted to be a reinforcement for sealing membranes, the flexible non-woven product providing mechanical and heat stability during heat treatments and durability as a sealing membrane reinforcement, wherein at least one population or fraction of the rigid particles, called "large particles," has a size such that either:

$3 \times (\sqrt{SMf})^3 \leq v$, or $5 \times (\sqrt{SMf})^3 \leq v$, where SMf corresponds to a mean cross-section of the fibers or filaments that form the layers of the non-woven product, and v represents a mean individual volume of the organic or mineral particles, and the mean individual volume verifies the following inequality of either:

$v \leq 50 \times (\sqrt{SMf})^3$, or $v \leq 30 \times (\sqrt{SMf})^3$.

2. The non-woven product according to claim 1, wherein the large particles constitute a majority fraction, in terms of either mass or volume, particulate feedstocks that are present in the non-woven product, and produce bridgings or connections between nodes, meshes, fibers and filaments of the same layer and between superposed layers that form the non-woven product.

3. The non-woven product according to claim 1, wherein the large particles have at least one dimension d such that either d≥3×DMf, or d≥5×DMf, where DMf corresponds to a mean diameter of the fibers or filaments that form the layers of the non-woven product.

4. The non-woven product according to claim 1, wherein the large particles have a mean size that corresponds to at least 20% of a mean size of pores of the non-woven product layers in the Z direction that is perpendicular to the XY plane of the non-woven product.

5. The non-woven product according to claim 1, wherein the large particles have a mean grain size that is greater than approximately 50 μm.

6. The non-woven product according to claim 1, wherein the large particles have a mean size that is less than approximately 120% of a mean size of visible pores of the layers of the non-woven product seen in the Z direction that is perpendicular to the XY plane of said product.

7. The non-woven product according to claim 1, wherein the large particles have a mean grain size that is less than approximately 400 μm.

8. The non-woven product according to claim 1, wherein the rigid particulate feedstocks also comprise a population or fraction of particles whose grain size is less than 30 μm.

9. The non-woven product according to claim 1, wherein the rigid particulate feedstocks are present with a ratio by weight of between 1% and 30% of a weight of the fibers or filaments that form the layers of the non-woven product.

10. The non-woven product according to claim 1, wherein material(s) forming rigid particles has (have) a melting point that is greater than that of material(s) forming the fibers or filaments of the layers, or at a temperature of activation, cross-linking or drying of the binder.

11. The non-woven product according to claim 1, wherein the rigid particles further comprise organic particles, and a melting point of the organic particles is less than that of the fibers or filament or less than or greater than a temperature of heat-setting, drying, activation or cross-linking of the material that forms the binder.

12. The non-woven product according to claim 1, wherein the rigid particles that form the feedstocks further comprises organic particles having a grain size that is greater than 20 μm.

13. The non-woven product according to claim 1, wherein a portion of the rigid particles forming the feedstocks are particles that can expand with temperature.

14. The non-woven product according to claim 1, wherein the continuous fibers or filaments forming the layers of the non-woven product are based on a thermoplastic polymer material that is selected from the group consisting of polypropylenes, polyesters, polyamides, polyethylenes, copolymers of these different polymers and possible mixtures of these different polymers and copolymers.

15. The non-woven product according to claim 1, wherein the non-woven product integrates—optionally at or between two or more constituent layers—reinforcing structures in the form of filaments, grid(s) and/or textiles with characteristics of high stabilization, wherein the rigid particles that are at least partially coated or encapsulated by the binder establish rigid bonds or produce bridgings between the reinforcing structures and the filaments or fibers of the layers by means of said binder.

16. The non-woven product according to claim 1, wherein at least one material that forms the mineral particles is selected from the group consisting of carbonates, silicates, sulfates, calcium carbonate, magnesium hydroxide, aluminum hydroxide, barium sulfate, clay, kaolin, quartz, talc, oxides, hydroxides, titanium oxide, bauxite, and gibbsite.

17. The non-woven product according to claim 1, wherein rigid particles further comprise organic particles, and at least one material that forms the organic particles is selected from the group consisting of fibrous or particulate celluloses, wood, lignin, graphites, micronized heat-settable recycled polymers, epoxy, and thermosetting phenol formaldehyde resin, micronized thermoplastic polymers, PET (polyethylene terephthalate), PBT (polybutylene terephthalate), PP (polypropylene), PE (polyethylene), PA (polyamide) and their copolymers.

18. The non-woven product according to claim 1, wherein the material that forms the binder is selected from the group consisting of resins with or without formaldehyde, liquid resins in emulsion or in dispersion, acrylate, styrene acrylate, vinyl acrylate, methacrylate, vinyl acrylate, acrylamides, methyl acrylamides, ethyl vinyl acetate, styrene butadiene, vinyl alcohol, butadiene acrylate, polyurethane, silicone, and cross-linking resins, based on phenol, melamine, urea, epoxy, alkyd, and polyester.

19. A flexible non-woven reinforcement for sealing membranes, comprising:

at least two layers of synthetic fibers or filaments superposed in a Z direction that is perpendicular to a XY plane of said product, having undergone at least one mechanical or hydraulic needling operation, whereby said non-woven product also integrates particulate feedstocks in a form of rigid particles distributed in a monomodal or multimodal manner in the product and is at least partially coated or encapsulated by a binding material that can provide connecting points between the filaments or fibers to one another, physical and mechanical properties of the flexible non-woven product being affected by size and number of the connecting points, and the binding material, wherein the flexible non-woven product provides mechanical and heat stability during heat treatments and durability as a sealing membrane reinforcement, the flexible non-woven product has a density of the reinforcement is less than 1 g/cm$^3$, if the particles are organic particles, a particle density of the organic particles being between 0.8 to 1.4 g/cm$^3$, if the particles are mineral particles, a particle density of the mineral particles being between 1.6 to 4.2 g/cm$^3$, at least one population or fraction of the particles has a size such that:

$$5 \times (\sqrt{SMf})^3 \leq v,$$

where SMf corresponds to a mean cross-section of the fibers or filaments that form the layers of the non-woven product, and v represents a mean individual volume of the organic or mineral particles, and the mean individual volume verifies the following inequality of either:

$$v \leq 30 \times (\sqrt{SMf})^3, \text{ or}$$

$$v \leq 50 \times (\sqrt{SMf})^3.$$

20. The non-woven product according to claim 1, wherein the rigid particles further comprise organic particles, and a density of the organic particles is between 0.8 to 1.4 g/cm$^3$.

* * * * *